United States Patent [19]

Hufnagel et al.

[11] Patent Number: 4,507,960

[45] Date of Patent: Apr. 2, 1985

[54] SPEED INDICATOR

[75] Inventors: Walter Hufnagel, Glasshütten; Alois Kreuz, Schmitten, both of Fed. Rep. of Germany

[73] Assignee: VDO Adolf Schindling AG, Frankfurt am Main, Fed. Rep. of Germany

[21] Appl. No.: 540,470

[22] Filed: Oct. 11, 1983

[30] Foreign Application Priority Data

Oct. 16, 1982 [DE] Fed. Rep. of Germany ....... 3238433

[51] Int. Cl.³ .............................................. G01C 21/12
[52] U.S. Cl. ................... 73/187; 416/223 R
[58] Field of Search ...................... 73/186, 187, 861.85, 73/861.78, 861.79, 861.74, 861.87, 861.88; 415/216; 416/197 A, 223 R, 223 A

[56] References Cited

U.S. PATENT DOCUMENTS

| Re. 28,839 | 6/1976 | Overs | 73/187 |
| 1,558,532 | 10/1925 | Chesler | 73/861.88 |
| 2,078,057 | 4/1937 | Chirca | 73/861.88 |
| 3,531,988 | 10/1970 | Casani et al. | 73/187 |
| 4,393,724 | 7/1983 | Werkmann et al. | 73/861.79 |

Primary Examiner—Jerry W. Myracle
Attorney, Agent, or Firm—Martin A. Farber

[57] ABSTRACT

A speed indicator for water vehicles which has a vane wheel transmitter mounted for rotation about an axis is exposed to the extent of one half thereof to the flow of water. In order to obtain a high measurement precision, the vanes of the vane wheel on their outgoing side with respect to the flow are formed with the profile of a convex streamlined airplane wing.

19 Claims, 4 Drawing Figures

SPEED INDICATOR

The present invention refers to a speed indicator for water vehicles having a vane wheel transmitter whose vane wheel, which is rotatably mounted upon a shaft, is exposed to the extent of one-half to the flow of the water.

In such speed indicators it is known to develop the vane wheel with straight radially directed vanes having an approximately rectangular cross section in the incoming flow direction. As a result, turbulent eddyings are formed on the incoming sides of the vanes, which eddyings, in case of high velocities of flow, even produce such as vacuum as to result in cavitation and damage to the vanes. These eddyings substantially interfere with a uniform reaction of the vane wheel to the flow of water since their intensity is dependent both on the instantaneous position of the individual vanes with respect to the direction of flow and on the instantaneous velocity of flow. Thus a dependable measurement of the speed is not possible.

The object of the invention is to create a speed indicator of the above-mentioned type which assures a high precision of measurement.

This object is achieved in accordance with the invention in the manner that the vanes (19, 19') of the vane wheel (1) are developed on their outgoing side (26) with the profile of a convex, streamlined airplane wing. This development leads, for the most different velocities of flow, to a laminar flow on the outgoing side of the vanes so that the measurement takes place with a high precision of measurement which is free of disturbances. This high precision of measurement is furthermore accompanied by increased sensitivity of response since the larger outgoing surface of the wing profile as compared with its incoming surface produces a turbulence-free suction on the outgoing side which acts on the vanes of the vane wheel in addition to the momentum of impingement by the stream on the incoming side. This leads to high starting sensitivity and thus to accurate measurement even at low speeds. While with known speed indicators a halfway usable measurement has been obtained only with a speed of about 1.5 knots, accurate measured values are now obtained with a speed of only about 0.2 to 0.4 knots.

In order to increase the sensitivity of response of the speed indicator while at the same time avoiding turbulence, the incoming side (25) of the vanes (19, 19') can be developed with the profile of a concave, streamlined airplane wing.

In order also to avoid the formation of turbulence on the vane wheel and thus disturbance of the measurement, the radially outwardly directed end of the vanes (19') may be developed with a radius (27) which passes smoothly into the outgoing side (26), it being particularly favorable if the streamlined wing profile of the outgoing side (26) extends from the outgoing side (26) up to the radially outwardly directed front edge (28) of the vanes (19).

In order to avoid the formation of turbulence not only on the ends but also on the side regions of the vanes, the vanes (19, 19') may have an approximately semicircular contour (23) as seen from the incoming direction (7). In order to avoid substantial interference it is sufficient for the semicircular contour (23) to be flattened at its side regions (24) since in these regions there are no longer any high circumferential speeds due to the relatively small radius to the axis. If that half of the vane wheel (1) which is not exposed to the flow of water extends into a housing chamber (8) whose wall (10) is at a constant distance from the peripheral contour (9) of the vane wheel (1), then a uniform laminar flow of the water is obtained also in this region, which further improves the positive properties of the speed indicator.

If the rotational movements of the vane wheel are detected inductively, for instance by a Hall sensor arranged in the housing of the speed indicator, it is advantageous if permanent magnets (21) are arranged, completely enclosed, in vanes (19') of the vane wheel (1). As a result, no edges or protruding burrs are produced on the surface of the vane wheel which might lead to the formation of disturbing eddies. For this, one development which is simple to produce consists in developing the vane wheel (1) by assemblying together a plurality of individual parts and with recesses (20) for the permanent magnets (21) which are open in disassembled condition and closed in the assembled condition, the vane wheel (1) preferably consisting of two mirror-image parts (11, 11'), the connecting plane of which is the central-sectional plane perpendicular to the axis (3). This makes it possible to provide a very thin wall on the radially outwardly directed side of the recesses so that the magnetic field is practically unaffected. In order to avoid problems of the insertion in proper position of the magnets, which are of only small size, the magnets can be installed in non-magnetized state and then magnetized after production of the vane wheel is completed.

In this connection, the assemblying is facilitated if alignment pins (13) which protrude at the connecting plane (12) of the one part (11) and engage into corresponding recesses in the other part (11') are provided.

If the parts (11, 11'), which are developed as plastic injection moldings, of the vane wheel (1) are welded together, for instance by ultrasonics, a smooth surface is obtained in simple fashion at the plane of joinder of the two parts of the vane wheel.

By supporting the vane wheel (1) on two bearing places (17) on the bore (16) which are developed at the axial side regions of the vane wheel (1), tilting of the vane wheel on the shaft within the bearing clearance is greatly limited. In this way not only the bearing resistance which must be overcome, but also change in thickness of the clearance between the vane wheel and the wall of the housing chamber are greatly reduced. The conditions of flow within this region are thus scarcely affected.

One preferred embodiment of the invention will be described in further detail below and is shown in the drawings, of which:

Figure 1:
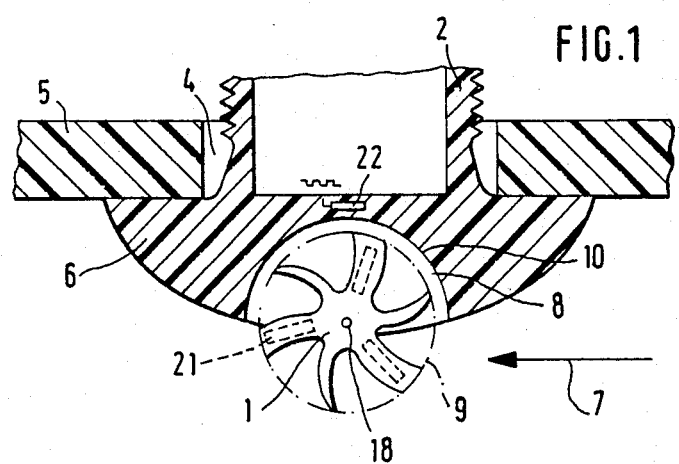
FIG. 1 is a cross section through a speed indicator according to the invention.
Figure 2:
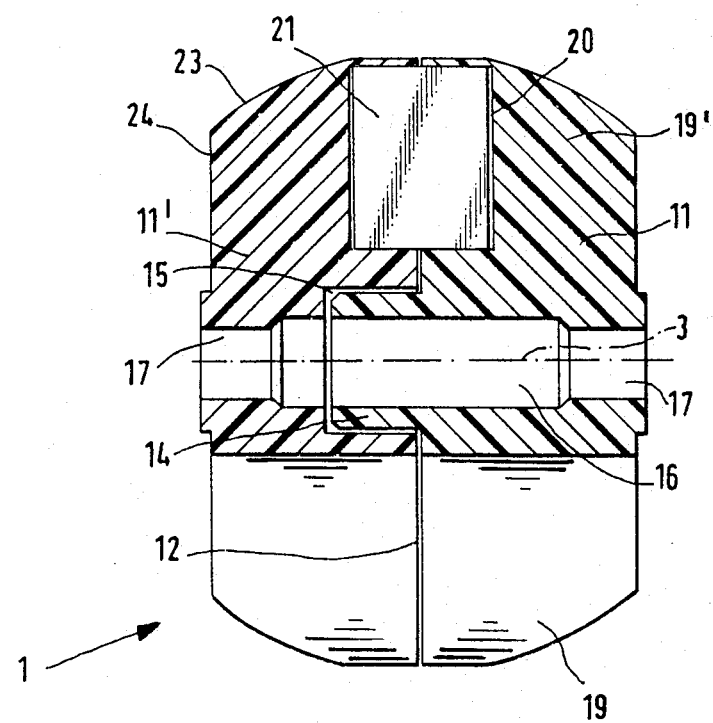
FIG. 2 is a cross section through the vane wheel of FIG. 3 along the line III—III.
Figure 3:
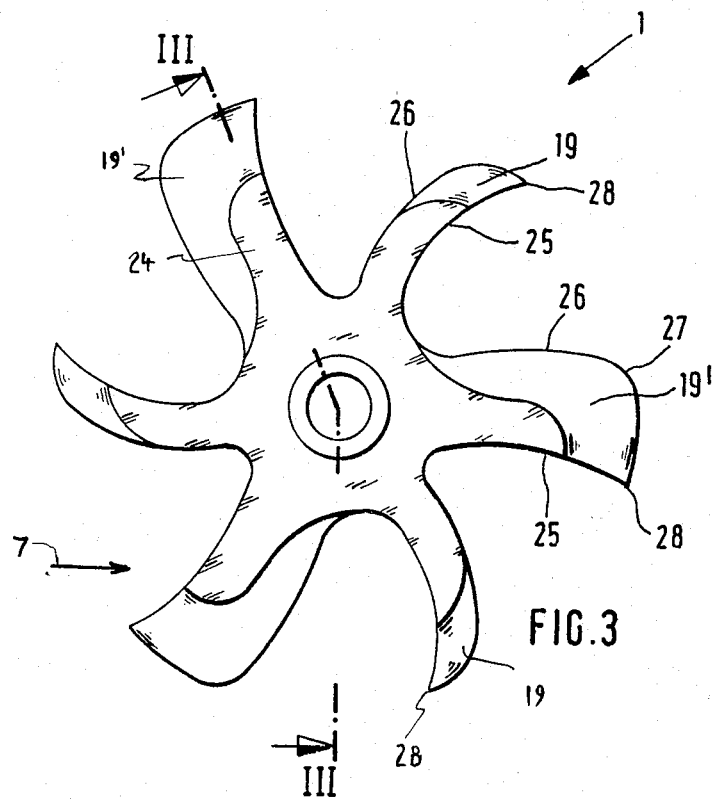
FIG. 3 is a side view of the vane wheel.
Figure 4:
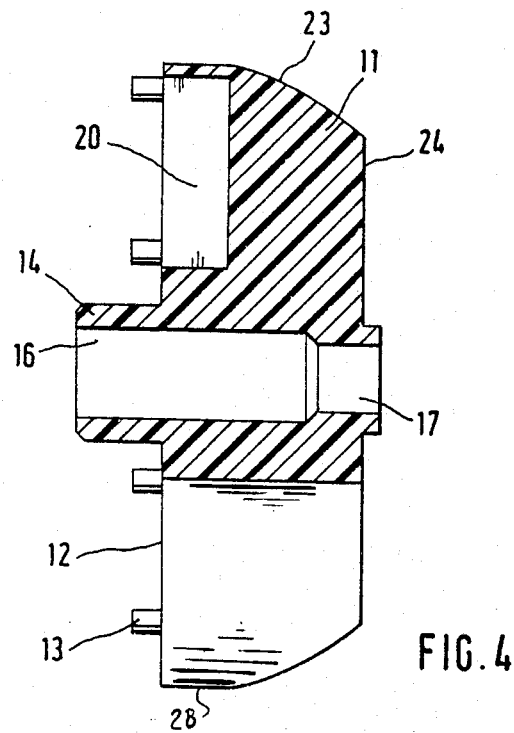
FIG. 4 shows a half of the vane wheel of FIG. 3 in section alone the line III—III.

The speed indicator shown has a vane wheel 1 which is rotatably mounted on a housing 2 for rotation around an axis 3. The housing 2 extends through a recess 4 in the bottom 5 of a water vehicle and on the water side has a mounting member 6 of a streamlined shape which is aligned with the direction of flow 7.

The region of the mounting member 6 on which the vane wheel 1 is arranged extends so far away from the body 5 that the vane wheel 1 is located outside the turbulent boundary layer along the bottom 5 of the water vehicle. Due to this and to the laminar flow around the mounting member 6 as a result of its streamlined shape, influences by turbulence on the measurement of the speed are avoided.

The vane wheel 1 is exposed only to the extent of one-half to the flow of the water, while the other half of the vane wheel 1 extends into a housing chamber 8 of the mounting member 6. This housing chamber 8 is so adapted to the peripheral contour 9 of the vane wheel 1 that between this peripheral contour 9 and the wall 10 of the housing chamber 8 there is formed a uniformly wide slot of relatively small size. This leads to laminar flow conditions in the housing chamber 8.

The vane wheel 1 is assembled from two approximately identical parts 11, 11'. Alignment pins 13 which protrude from the connecting plane 12 of the one part 11 engage into corresponding recesses in the other part 11'.

For the centering of the two parts 11, 11' with respect to each other there is provided a centrally protruding plug 14 which engages into a corresponding central hole 15 in the part 11'.

The mounting borehole 16 which is developed as a continuous hole in the vane wheel 1, is provided in its central region with a larger diameter so that the bearing places 17 against which a journal 18 rests are present only in the axial side regions of the vane wheel 1. This leads to the avoidance of lateral tilting of the vane wheel 1 on the journal 18.

In three of the six vanes 19, 19' of the vane wheel 1 which are developed, furthermore, of larger width in the circumferential direction, recesses 20 are formed which are open towards the connecting plane of the two parts 11, 11'. These recesses 12 serve for a completely enclosed reception of radially magnetized permanent magnets 21 whose magnetic fields act on a Hall sensor arranged within the housing 2.

The arrangement of the Hall sensor 22 separated from the housing chamber 8 within the housing 2 makes it possible, on the one hand, to connect the Hall sensor 22 to an electronic system and a display without any problems as to sealing. On the other hand, no edges or recesses which could unfavorably influence the flow are required in the wall 10.

The parts 11, 11' of the vane wheel 1, which are plastic injection moldings, are inserted one within the other after the insertion of the permanent magnets 21 and then welded together by ultrasonics. In this way edges and burrs are avoided.

The vanes 19, 19' have a semicircular contour 23 with flattened side regions 24.

The incoming sides 25 of the vanes 19, 19' are developed with a concave streamlined airplane-wing profile. The concave shape leads to reinforcing the momentum exerted by the flow of water on the vane wheel 1. The streamlined wing profile produces laminar flow conditions on the incoming side 25.

The outgoing side 26, whose surface is larger than that of the incoming side 25, is also developed with a streamlined airplane-wing profile, which, however, is convex.

In this case also the wing profile serves to produce laminar flow conditions. The larger surface of the outgoing side 26 as compared with the incoming side 25 leads to the production of a suction on the outgoing side 26, which suction is so great that about 80% of the forces acting on the vane wheel 1 are applied by the suction and 20% of the forces are applied by the flow momentum acting on the incoming side 25. This leads to a high sensitivity of response of the speed indicator so that an exact measurement can be made even at low speeds.

The radially outwardly directed ends of the vanes 19' are formed with a radius 27 which passes smoothly into the outgoing side 26, while in the case of the vanes 19 the streamlined wing profile extends from the outgoing side 26 up to the radially outwardly directed front edge 28 of the vanes 19. Both measures serve to avoid turbulent flow conditions. Each of the vanes 19 are between two of the vanes 19' and vice versa.

Since all parts of the speed indicator which are exposed to the flow of water are substantially streamlined, there are no substantial turbulences, as a result of which the measurement of the speed can be carried out with great accuracy.

Herein the term "streamlined airplane wing profile" or the like means the general aerodynamic shape of a plane wing.

This embodiment has been described as an example of the invention only and not in a limiting sense.

We claim:

1. In a speed indicator for water vehicles comprising a vane wheel transducer, and a vane wheel rotatably mounted on a journal and exposed to the extent of one half thereof to flow of the water, the improvement wherein the vane wheel has vanes, the vanes entering the flow defining flow incoming sides and flow outgoing sides, the vanes of the vane wheel being formed non-planar on said flow outgoing sides with the profile of a convex, streamlined airplane wing.

2. The speed indicator for water vehicles as set forth in claim 1, wherein said incoming sides of said vanes are developed with the profile of a concave, streamlined airplane wing.

3. The speed indicator for water vehicles as set forth in claim 1, wherein a radially outwardly directed end of some of said vanes is formed with a radius of curvature which passes smoothly into the respective of said outgoing sides.

4. The speed indicator for water vehicles as set forth in claim 3, wherein each of said some of said vanes are between two of the other of said vanes, permanent magnets are arranged, completely enclosed, in said some of said vanes of the vane wheel.

5. The speed indicator for water vehicles as set forth in claim 4, wherein said convex streamlined airplane wing profile of said flow outgoing sides of the other of said vanes extends from said outgoing sides up to a radially outwardly directed front edge of the respective said other vanes.

6. The speed indicator for water vehicles as set forth in claim 1, wherein said convex, streamlined airplane wing profile of said outgoing sides of some of said vanes extends from said outgoing sides up to a radially outwardly directed front edge of the respective of said vanes.

7. The speed indicator for water vehicles as set forth in claim 1, wherein said vanes have a substantially semicircular contour as viewed from the flow incoming direction.

8. The speed indicator for water vehicles as set forth in claim 7, wherein
said substantially semicircular contour is flattened at side regions thereof.

9. The speed indicator for water vehicles as set forth in claim 1, further comprising
a housing having a wall defining a housing chamber,
an other half of the vane wheel which is unexposed to the flow of water extends into said housing chamber,
said wall is spaced a constant distance from the peripheral contour of said vane wheel.

10. The speed indicator for water vehicles as set forth in claim 1, further comprising
permanent magnets are arranged, completely enclosed, in at least some of said vanes of the vane wheel.

11. The speed indicator for water vehicles as set forth in claim 10, wherein
said vane wheel comprises a plurality of individual parts and forms recesses,
said permanent magnets are disposed in said recesses,
said recesses are open in said individual parts respectively and closed in an assembled condition of said individual parts.

12. The speed indicator for water vehicles as set forth in claim 11, wherein
said plurality of individual parts comprises two mirror-symmetrical parts defining a connecting plane, the latter being a central sectional plane perpendicular to an axis of rotation of said vane wheel.

13. The speed indicator for water vehicles as set forth in claim 11, wherein
said parts of the vane wheel are plastic injection molded parts and are welded together.

14. The speed indicator for water vehicles as set forth in claim 10, further comprising
a housing having a wall defining a housing chamber,
the other half of the vane wheel which is unexposed to the flow of water extends into said housing chamber,
an electro-magnetic sensor is disposed within said housing spaced from said wall.

15. The speed indicator for water vehicles as set forth in claim 1, wherein
said vane wheel about its axis of rotation is formed with two bearing places adjacent axial side regions respectively of the vane wheel,
said vane wheel is operatively mounted at said two bearing places.

16. The speed indicator for water vehicles as set forth in claim 1, wherein all portions of said flow outgoing sides are non-planar.

17. In a speed indicator for water vehicles comprising a vane wheel transducer, and a vane wheel rotatably mounted on a journal and exposed to the extent of one half thereof to flow of the water, the improvement wherein
the vane wheel has vanes, the vanes entering the flow defining flow incoming sides and flow outgoing sides,
the vanes of the vane wheel being formed on said flow outgoing sides with the profile of a convex, streamlined airplane wing,
permanent magnets are arranged, completely enclosed, in at least some of said vanes of the vane wheel,
said vane wheel comprises a plurality of individual parts and forms recesses,
said permanent magnets are disposed in said recesses,
said recesses are open in said individual parts respectively and closed in an assembled condition of said individual parts,
said plurality of individual parts comprises two mirror-symmetrical parts defining a connecting plane, the latter being a central sectional plane perpendicular to an axis of rotation of said vane wheel, and
alignment pins each projecting from one of the parts at the connecting plane and engaging into corresponding recesses formed in the other part.

18. In a speed indicator for water vehicles comprising a vane wheel transducer, and a vane wheel rotatably mounted on a journal and exposed to the extent of one half thereof to flow of the water, the improvement wherein
the vane wheel has vanes, the vanes entering the flow defining flow incoming sides and flow outgoing sides,
the vanes of the vane wheel being formed on said flow outgoing sides with the profile of a convex, streamlined airplane wing,
a radially outwardly directed end of some of said vanes is formed with a radius of curvature which passes smoothly into the respective of said outgoing sides,
each of said some of said vanes are between two of the other of said vanes,
permanent magnets are arranged, completely enclosed, in said some of said vanes of the vane wheel,
said convex streamlined airplane wing profile of said flow outgoing sides of the other of said vanes extends from said outgoing sides up to a radially outwardly directed front edge of the respective said other vanes,
said some vanes have a width in a circumferential direction larger than that of said other vanes.

19. In a speed indicator for water vehicles comprising a vane wheel transducer, and a vane wheel rotatably mounted on a journal and exposed to the extent of one half thereof to flow of the water, the improvement wherein
the vane wheel has vanes, the vanes entering the flow defining flow incoming sides and flow outgoing sides,
the vanes of the vane wheel being formed completely over said flow outgoing sides with the profile of a convex, streamlined airplane wing surface.

* * * * *